(12) United States Patent
Todokoro et al.

(10) Patent No.: US 6,868,428 B2
(45) Date of Patent: Mar. 15, 2005

(54) METHOD AND SYSTEM OF SYNCHRONIZING DATABASES OF A PLURALITY OF MONITORING DEVICES

(75) Inventors: Gaku Todokoro, Kawasaki (JP); Takashi Onodera, Kawasaki (JP); Shoji Tsuchiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 09/960,103

(22) Filed: Sep. 21, 2001

(65) Prior Publication Data

US 2002/0147737 A1 Oct. 10, 2002

(30) Foreign Application Priority Data

Apr. 10, 2001 (JP) ........................................ 2001-111904

(51) Int. Cl.[7] .............................................. G06F 17/30
(52) U.S. Cl. ...................... 707/203; 707/200; 707/201; 709/201; 709/224; 370/252
(58) Field of Search ................................ 707/203, 201, 707/200, 10; 709/201, 224, 223; 370/252

(56) References Cited

U.S. PATENT DOCUMENTS

| | | | | |
|---|---|---|---|---|
| 5,758,083 A | * | 5/1998 | Singh et al. ................ | 709/223 |
| 6,282,570 B1 | * | 8/2001 | Leung et al. ............... | 709/224 |
| 6,330,600 B1 | * | 12/2001 | Matchefts et al. .......... | 709/223 |
| 6,345,288 B1 | * | 2/2002 | Reed et al. ................. | 709/201 |

* cited by examiner

Primary Examiner—Charles Rones
(74) Attorney, Agent, or Firm—Katten Muchin Zavis Rosenman

(57) ABSTRACT

A method of synchronizing databases of a plurality of monitoring devices in a communications system having a communications device, a first monitoring device and a second monitoring device for monitoring the communications device and a network connecting these devices. Each monitoring device accommodates a database. The first monitoring device transmits a control command with a network address of the first monitoring device to the communications device. The communications device transmits the received network address to the second monitoring device. The first monitoring device updates registered data recorded in the database accommodated by the first monitoring device. The second monitoring device transmits a read-out request for reading out registered data which is altered by the updating operation and recorded in the database accommodated by the first monitoring device, to the first monitoring device by using the network address of the first monitoring device received from the communications device. When the second monitoring device receives the registered data, the second monitoring device updates registered data recorded in the database accommodated by the second monitoring device based on the received registered data.

15 Claims, 10 Drawing Sheets

FIG. 8

| CONTROL NUMBER | POINTER | POINTER | POINTER | ••• |
|---|---|---|---|---|
| 1 | DATA1 | DATA3 | | |
| 2 | DATA2 | DATA5 | | |
| 3 | | | | |

57b

| DATA | VALUE |
|---|---|
| DATA1 | VALUE1 |
| DATA2 | VALUE2 |
| DATA3 | VALUE3 |
| DATA4 | VALUE4 |
| DATA5 | VALUE5 |
| DATA6 | VALUE6 |
| DATA7 | VALUE7 |

FIG. 9

| DATA | CONTENT |
|---|---|
| 1, 2, 3··· | READ OUT AS CONTROL NUMBER |
| NULL | READ OUT ALL DATA |
| 0 | READ OUT REGISTERED NE |

METHOD AND SYSTEM OF SYNCHRONIZING DATABASES OF A PLURALITY OF MONITORING DEVICES

BACKGROUND OF THE INVENTION

1. Field of the Invention

The present invention relates to a method of synchronizing databases of a plurality of centralized monitoring devices and a system of synchronizing databases of a plurality of centralized monitoring devices, in which the method and system comprise: a communications device; a first centralized monitoring device and second centralized monitoring device for monitoring the communications device; and a network to which these devices are connected, and in which each of the centralized monitoring device accommodates a database.

2. Description of the Related Art

In the conventional art, there is known a communications system comprised of a communications device (hereinafter "NE" (network element) units); a plurality of centralized monitoring devices (hereinafter "OPS" (operating systems) units) for monitoring the NE; and a network to which these are connected, in which each OPS accommodates a database.

In the same system, the data recorded in the database managed by an OPS is comprised chiefly of physical data inside the NE and logical data inside the OPS. The physical data inside the NE is comprised of data inside the NE such as settings for the operations of the communications device. The logical data inside the OPS is comprised of data such as path management data and comments.

The physical data inside the NE is altered by means of controls from the OPS. The data inside the OPS is altered by the altering operation from the OPS. The logical data inside the OPS is altered by means of controls performed on the NE, and is also altered by closed manipulations inside the OPS.

The following methods are known for synchronization (also referred to as "matching") of the databases of each OPS in communications system described above:

(1) A method in which a master OPS is determined and the other OPS units make inquiries to the master OPS regarding altered information in the database at regular intervals. Alternatively, a method in which the master OPS communicates altered information to the other OPS units.

(2) A method in which a master is not determined, and an OPS in which a database alteration has occurred performs a notification to the other OPS units indicating that there was an alteration.

(3) A method in which for the purpose of synchronizing the physical data inside the NE, when the physical data held by the NE is altered, this altered information is sent as an NE data alteration notification to the OPS being monitored by that NE (i.e., to the OPS to which that NE is linked to), and the OPS which received the NE data alteration notification modifies its own database in accordance with the content of the notification.

The following problems exist with the conventional technologies for synchronizing the two types of data managed by the OPS (i.e., the physical data inside the NE and the logical data inside the OPS).

According to the methods (1) and (2) described above, in order to perform the communication between the OPS units, it is necessary for each OPS to posses and manage the network addresses of the other OPS units included in the network. Therefore, there is the problem in that in the case where a new OPS is added to the network (or in the case where the OPS address changes due to an OPS unit being moved or to a modification having been made to the structure of the network), it becomes necessary to perform a procedure (of operations such as rebooting, for example) to register the newly added (or altered) OPS address in all of the existing OPS units, and large numbers of personnel and many work hours are necessary to for this registration, and also, it is difficult to perform the addition of the new OPS or the modifications to the structure of the network. As the OPS units included in the communications system (i.e., the network) increase, this problem becomes more conspicuous.

Note that according to the method (3) described above, for the physical data inside the NE it is possible for each OPS to modify its own database based on the NE data alteration notifications sent from the NE units; therefore, it is possible to achieve the synchronization (i.e., "matching") of the databases of the respective OPS units.

However, alterations of the logical data inside the OPS are performed by means of close manipulations inside the OPS. Accordingly, in order to achieve synchronization of the databases of the OPS units, it is necessary to obtain the data that was altered by means of the database alteration, and then have an operator perform such procedures inputting this altered data into the other OPS units by hand, for example.

Therefore, there exists the problem in that in the case where the database inside the OPS (i.e., the logical data inside the OPS) is changed by means of closed operations inside the OPS, large numbers of personnel and many work hours are necessary for such procedures as performing manual inputs. As the number of OPS units included in the communications system (i.e., the network) increases, this problem becomes more conspicuous.

Further, there is a problem in that in such a case where the communication between the OPS and the NE is severed, or where the OPS reboots, it is not possible to establish synchronization ("matching") between the OPS units even though such may be necessary at that time.

Further, in the case where a new OPS is added to the network, it is necessary to register the NE units in the new OPS by hand; therefore, there is a problem in that large number of personnel and many work hours are necessary to perform this registration. This problem becomes more conspicuous as the number of NE units included in the communications system (i.e., the network) increases.

A first objective of the present invention is to achieve synchronization (or matching) of databases of OPS units (including physical data inside an NE and logical data inside the OPS units, for example) in a communications system which includes a communications device and a plurality of monitoring devices for monitoring the communications device, and in which each of the monitoring devices accommodates a database, without each of the OPS units storing and managing the network addresses of the other OPS units included in the communications system (i.e., the network)

A second objective of the present invention is to achieve synchronization (or matching) of the databases of the OPS units (i.e., chiefly the logical data inside the OPS) in the case where a database (i.e., chiefly the logical data inside the OPS) is altered due to a closed operation inside the OPS (i.e., due to an operation which does not include performing of controls on the NE), without performing such procedures as manual input, for example.

A third objective of the present invention is to achieve synchronization (i.e., matching) with the most recent of the databases managed by the other OPS units when necessary with the least possible amount of work, such as in the case where the communication between the OPS and the NE is severed or where the OPS is rebooted.

A fourth objective of the present invention is to register a new OPS in the NE by the least possible amount of work in the case where the new OPS is added to the network.

SUMMARY OF THE INVENTION

The present invention has a construction of a method of synchronizing databases of a plurality of monitoring devices in a communications system having a communications device, a first monitoring device and a second monitoring device for monitoring the communications device and a network connecting these devices, in which each of the monitoring devices accommodates a database, comprising: a first step of transmitting, by the first monitoring device, a control command with a network address of the first monitoring device to the communications device; a second step of transmitting, by the communications device, the network address of the first monitoring device received from the first monitoring device to the second monitoring device; a third step of updating, by the first monitoring device, registered data recorded in the database accommodated by the first monitoring device; and a fourth step of transmitting, by the second monitoring device, a read-out request for reading out registered data which is altered by the updating operation and recorded in the database accommodated by the first monitoring device to the first monitoring device by using the network address of the first monitoring device received from the communications device, and wherein when the second monitoring device receives the registered data altered by the updating operation from the first monitoring device, the second monitoring device updates registered data recorded in the database accommodated by the second monitoring device based on the registered data received from the first monitoring device.

According to the present invention, the second monitoring device uses the address of the first monitoring device which it received from the communications device in order to obtain from the first monitoring device the registered data which has been altered due to the updating of the registered data recorded in the database of the first monitoring device. Then, the second monitoring device uses the registered data which it has thus obtained and updates the registered data recorded in its own database. That is, it is possible to achieve synchronization of the first monitoring device and the second monitoring device without each of the monitoring devices having to possess and manage the addresses of the other monitoring devices.

The synchronizing method described above can be configured such that the method further comprises a fifth step of performing control by the communications device, based on the control command received from the first monitoring device, and transmitting, by the communications device, the controlled result to the first monitoring device, wherein the third step, when the first monitoring device receives the controlled result from the communications device, the first monitoring device updates registered data recorded in the database accommodated by the first monitoring device.

Such a configuration enables synchronization (or matching) to be achieved between a database which is updated as controls are performed on the communications device and another database or databases.

The synchronizing method for databases of a plurality of monitoring devices described above can be configured such that the method further comprises a sixth step of receiving, by the first monitoring device, a control request for controlling the communications device from an operator; wherein the first step, when the first monitoring device receives the control request from the operator, the first monitoring device transmits the control command with a network address of the first monitoring device to the communications device.

Such a configuration enables synchronization (or matching) to be achieved as needed between databases in accordance with a request from the operator.

It is also possible for the registered data to be either physical data or logical data. As an example of physical data, the data may be data managed inside the communications device such as settings for operations of the communications device.

The synchronizing method described above can be configured such that the method further comprises a seventh step of receiving, by the first monitoring device, a request for altering the database accommodated by the first monitoring device which does not control the communication device from the operator; wherein the first step, when the first monitoring device receives the request which does not control the communication device from the operator, the first monitoring device transmits a dummy control command with a network address of the first monitoring device to the communications device.

Such a configuration enables synchronization (or matching) between or among databases of the OPS units in the case where the database (i.e., the logical data) is altered due to closed manipulations internal to the OPS, without relying on manual inputting or other such procedures. The logical data may be data being managed inside the monitoring device, such as path management data or comments.

The synchronizing method described above can be configured such that, in the first step, the first monitoring device transmits to the communications device the control command with the network address of the first monitoring device and a altered data specification data to specify registered data which is altered by the updating operation and recorded in the database accommodated by the first monitoring device; wherein the second step, the communication device transmits to the second monitoring device the network address of the first monitoring device and the altered data specification data which are received from the first monitoring device; wherein the fourth step, the second monitoring device transmits to the first monitoring device the read-out request with the altered data specification data received from the communications device, when the second monitoring device receives registered data specified by the altered data specification data from the first monitoring device, the second monitoring device updates the registered data recorded in the database accommodated by the second monitoring device based on the registered data which is specified by the altered data specification data and received from the first monitoring device.

In such a configuration, the altered data specification data enables the second monitoring device to obtain only the least amount of registered data which is necessary to establish the synchronization of its database. This altered data specification data may be a control number, for example.

The synchronizing method of synchronizing databases of a plurality of monitoring devices in a communications system having a communications device, a first monitoring device and a second monitoring device for monitoring the communications device and a network connecting these devices, and in which the communications device retains a network address of the second monitoring device and each of the monitoring devices accommodates a database, comprising a step of: transmitting, by the first monitoring device, a request for reading the network address of the second monitoring device to the communications device; transmitting, by the first monitoring device, a request for reading registered data which is altered by a updating operation and recorded in the database accommodated by the second monitoring device to the second monitoring device by using the network address of the second monitoring device received from the communications device, when the first monitoring device receives the network address of the second monitoring device from the communications device; updating, by the first monitoring device, registered data recorded in the database accommodated by the second monitoring device based on the registered data received from the first monitoring device, when the first monitoring device receives the registered data which is altered by the updating operation and recorded in the database accommodated by the second monitoring device from the second monitoring device.

In such a configuration, even in the case where the communication between the OPS and the NE is severed or where the OPS is rebooted, it is still possible to achieve synchronization with the most current of the databases managed by the OPS units as necessary and with the least possible amount of work. Note that the registered data read-out request which is transmitted to the second monitoring device may be a read-out request for registered data which has been altered by updating performed on the registered data.

The synchronizing method for synchronizing databases of a plurality of monitoring devices in a communications system having a first communications device and a second communications device, a first monitoring device for monitoring these communications devices and a network connecting these devices, and in which the first communications device retains a network address of the first monitoring device, and the first monitoring device accommodates a database storing data relevant to the second communications device, comprising a step of: transmitting, by a second monitoring device, a request for reading the network address of the first monitoring device to the first communication device, when the second communications device is newly connected to the network; transmitting, by a second monitoring device, to the first monitoring device a request for reading data relevant to the second communications device which is recorded in the database accommodated by the first monitoring device , by using the network address of the first monitoring device received from the first communication device, when the second monitoring device receives the network address of the first monitoring device from the first communications device; recording, by the second monitoring device, the data relevant to the second communications device received from the first monitoring device in a data base accommodated by the second monitoring device, when the second monitoring device receives the data relevant to the second communications device from the first monitoring device.

In such a configuration, in the case where a new OPS is added to the network, it is possible to register the NE with the new OPS by means of the least possible amount of work.

BRIEF DESCRIPTION OF THE DRAWINGS

In the accompanying drawings:

FIG. 8 shows one example of OPS database structure according to the present invention;

FIG. 9 shows one example of data for identifying content read out from a database.

DETAILED DESCRIPTION OF THE PREFERRED EMBODIMENTS

Figure 1:
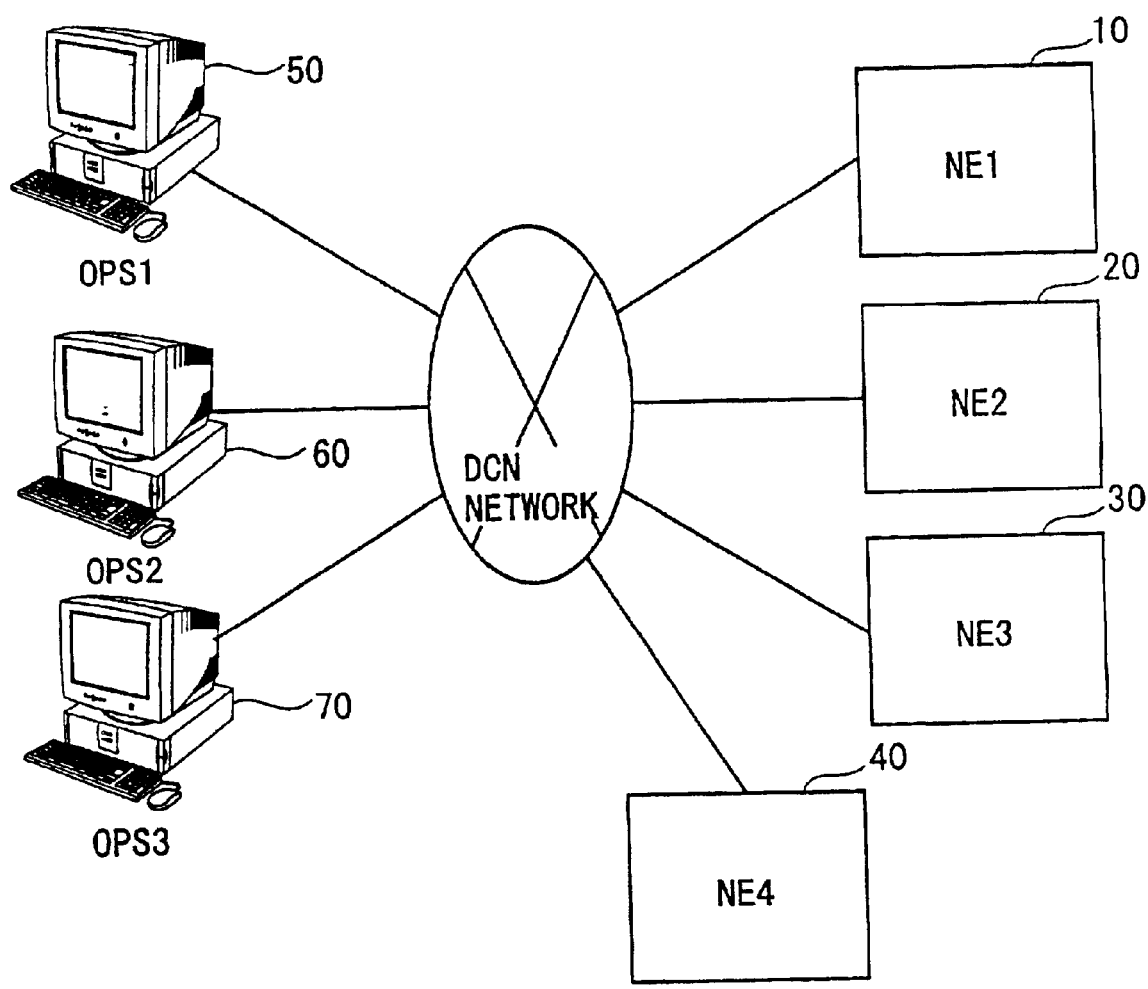
FIG. 1 is a diagram for explaining one embodiment by depicting an outline system construction of a system of synchronization of databases of a plurality of centralized monitoring devices (OPS units)

Hereinafter, explanation will be made of an embodiment of the present invention which is a system of synchronizing databases of monitoring devices (hereinafter, referred to as "OPS" units) with reference to the drawings. FIG. 1 is a diagram for explaining an outline system structure of the system of synchronizing the databases of the various OPS units.

The same system comprises a plurality of communications devices (hereinafter, referred to as "NE" units) 10, 20, 30 and 40; OPS units 50, 60 and 70 for monitoring these NE units; and a network such as a DCN network to which these devices are connected, and the OPS units 50, 60 and 70 have databases 57, 67 and 77, respectively.

The NE 10 (NE units 20, 30 and 40 are similar) has a CPU, a RAM and a ROM connected to the CPU through a bus and a memory device such as a hard disk device. In this memory device, there are stored a database 15 and a given program for functioning as the NE, for example. In the database 15, there is registered such data as the physical data inside the NE (i.e., such as the data of the settings for the operations of the NE 10 itself which is managed inside the NE), and the network addresses of the OPS units 50, 60 and 70 that monitor the NE (i.e., the OPS units which that NE 10 is linked to). These OPS addresses are used on such occasions as when a warning or such generated at the NE 10 itself is sent to the OPS 50, 60 and 70 which monitors that NE 10.

Figure 2:
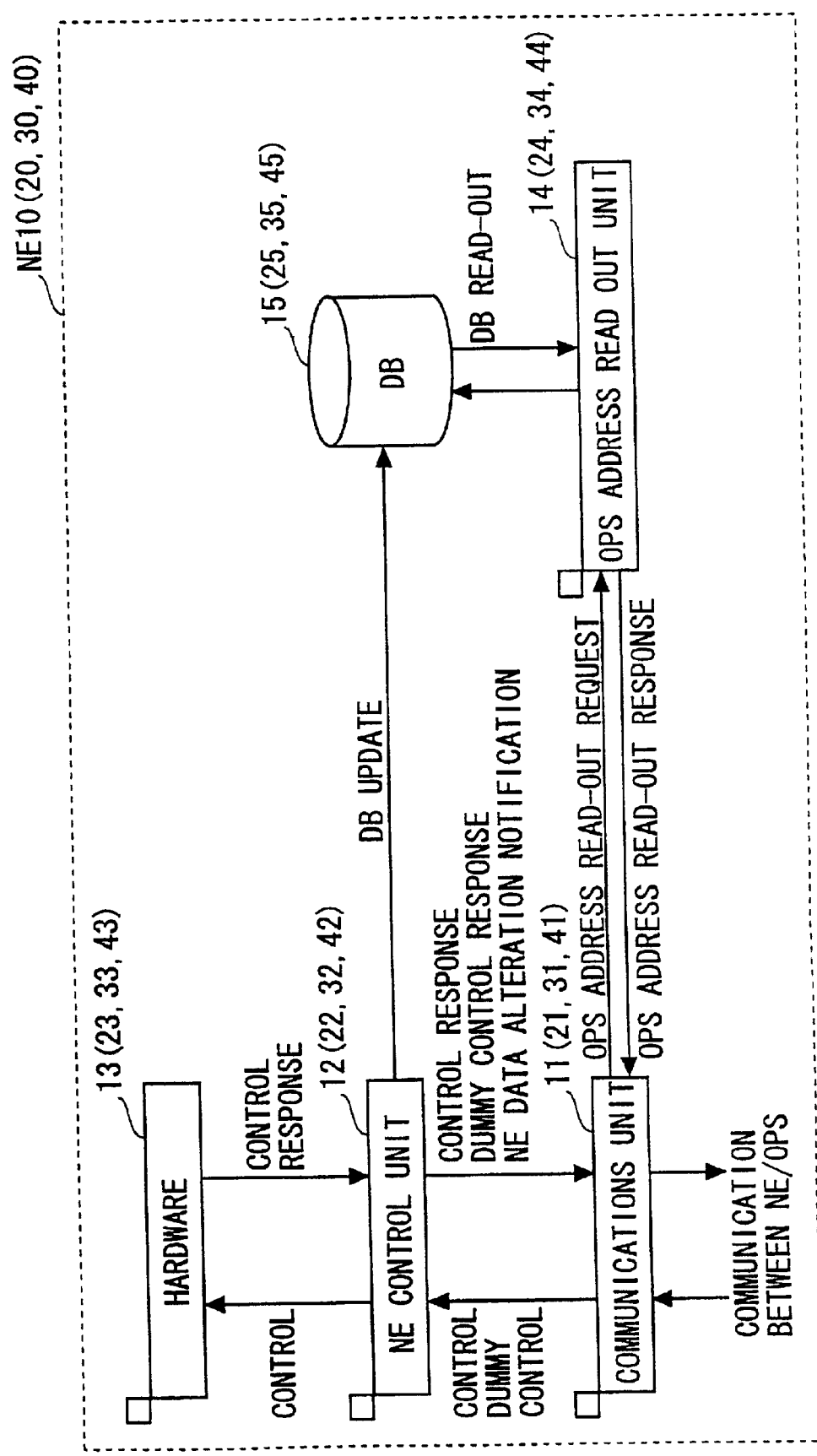
FIG. 2 is a functional block diagram of a communications device (i.e., NE)

FIG. 2 is a functional block diagram for explaining functions of the NE. The NE 10 (the NE units 20, 30 and 40 are similar) comprises a communications unit 11, an NE control unit 12 and an OPS address read-out unit 14. These are chiefly realized by means of given programs. The NE 10 also comprises hardware 13.

The communications unit 11 receives from the OPS 50 (or from the OPS 60, etc.) a control request to the NE 10 itself, and a read-out request to read out the address of the OPS 60 (or OPS 50, etc.) which monitors the NE 10 itself (i.e., the OPS units which the NE 10 itself is linked to), and it distributes the received requests to each function.

The communications unit 11 has a function for replying to the source of these requests, the OPS 50 (or OPS 60, etc.) with a control reply or with a read-out reply, and also a function for sending an NE data alternation notification for communicating to the OPS 50, 60 which monitor the NE 10 itself (i.e., the OPS which the NE 10 itself is linked to) a message indicating that an alteration has been made in the case where the database 15 inside the NE 10 itself (i.e., the physical data inside the NE) has been altered.

The NE control unit 12 has a function for performing control of the hardware 13 in the case where a control request is received from the OPS 50 (or the OPS 60, etc.), altering the database 15 of the NE 10 based on the control results, and performing a notification of the control results as a control response to the source of the control request OPS 50 (or OPS 60, etc.); and a function for transmitting an NE data alteration notification to the OPS 50 (or the OPS 60, etc.) monitoring the NE 10 when there is an alteration to the database 15.

In the case where the OPS address read-out unit 14 receives an OPS address read-out request from the OPS 60 (or the OPS 50, etc.), the OPS address read-out unit 14 reads out from the NE 10 database 15 the address of the OPS 50 (or the OPS 60, etc.) which monitors the NE 10, and sends this OPS address as a read-out reply to the source of the OPS address read-out request OPS 60 (or OPS 50, etc.).

The OPS 50 (OPS 60, 70 are similar) is a personal computer, a workstation or a main frame, for example, and comprises an image display device such as a liquid crystal display or a CRT display, an input means such as a mouse or a keyboard, and a memory device such as a hard disk device. In this memory device there is installed software such as a predetermined operating system and a monitoring program for monitoring the NE. Further, the data base 57 is installed in the memory device.

In the database 57 there is recorded the data relevant to the NE (such as the physical data inside the NE, for example), and the closed data inside the OPS (i.e., the logical data inside the OPS) for managing the NE. Further, as will be explained below, a table 57a is also stored therein (see FIG. 4), and this establishes correspondences between control numbers and the altered data so that these can be managed.

Figure 3:
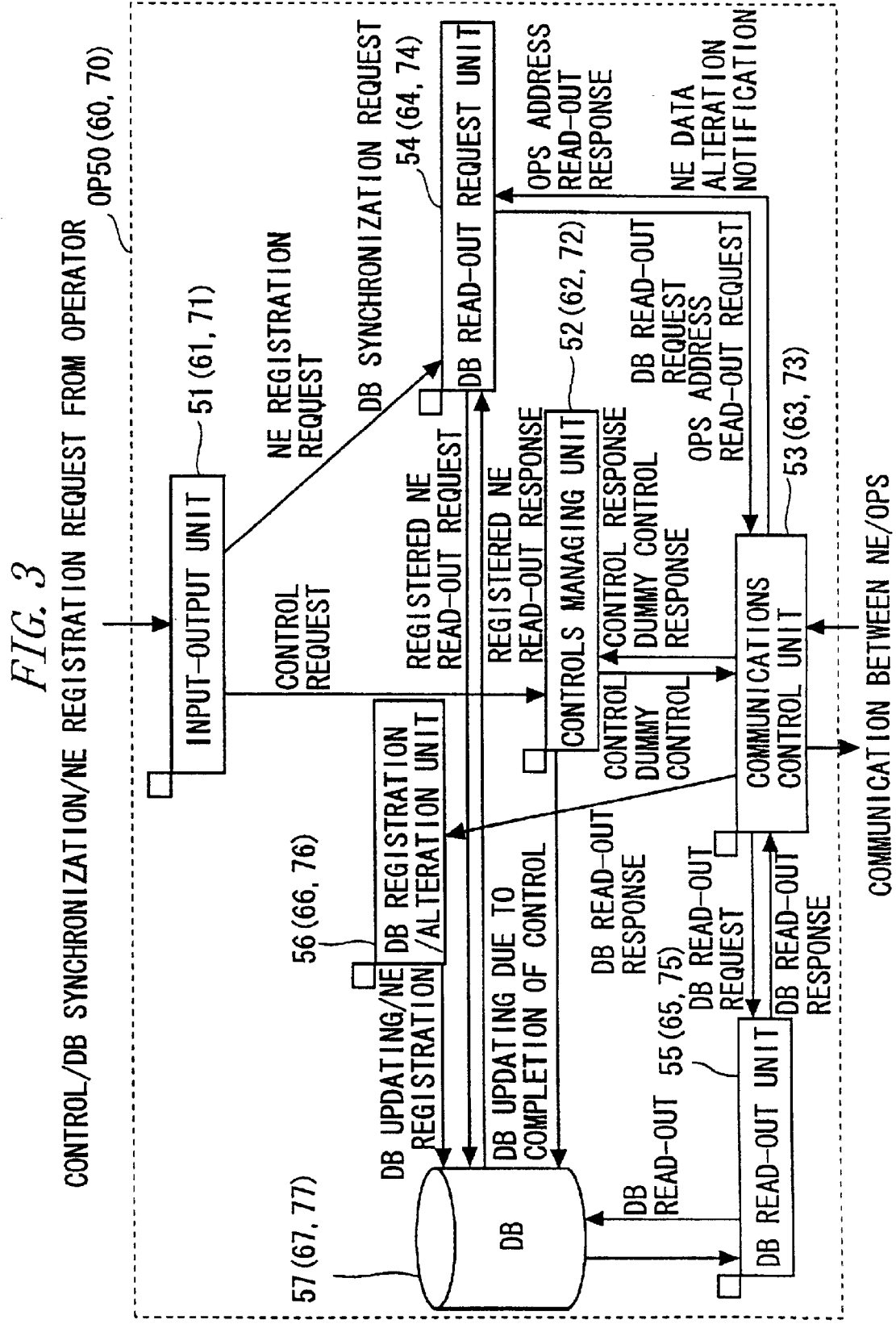
FIG. 3 is a functional block diagram of the OPS.

FIG. 3 is a functional block diagram for explaining functions of the OPS. The OPS 50 (OPS 60, 70 are similar) comprises an input-output unit 51, a control management unit 52, a communications control unit 53, a database read-out request unit 54, a database read-out unit 55 and a database registration/alteration unit 56. These are realized chiefly by programs such as a monitoring program.

The input-output unit 51 receives a control request to control the NE (or the NE 20, etc.) and an alteration request to alter the data in side the OPS 50 of the input-output unit 51. The input-output unit 51 also receives an NE registration request and a database synchronization request.

The control management unit 52 has a function for distributing control numbers to the control requests from the input-output unit 51, managing control information (i.e., registration data that has been updated and thus altered) which corresponds to these control numbers and simultaneously requesting the communications control unit 53 to control the NE 10 (or the NE 20, etc.). Further, the control management unit 52 has a function for receiving the reply of the control results from the NE 10 (or the NE 20, etc.) and updating the data base 57 based on this results reply. Also, as for the updating of the database 57, the information of the control numbers is also reflected in the database 57, and this makes it possible for the content of each update (i.e., the registration data which has been updated and altered) corresponding to each of the control numbers to be managed in the database 57.

The communications control unit 53 has: a function for receiving a communications request from the control management unit 52, the database read-out request unit 54 and the database read-out unit 55, and sending notification of this request to the NE 10 (or the NE 20, etc.) and the other OPS units 60, etc.; and a function for managing which entity the received notification should be forwarded to.

The database read-out request unit 54 uses the request from the input-output unit 51 and the NE data alteration notification from the communications control unit 53 and, based on these, reads out from the database 57 the address of the NE 10 (or NE 20, etc.) which is registered in the OPS 50 of the unit 54, and performs a request to the NE 10 (or NE 20, etc.) which read out the address from the communications control unit 53 for reading out the address of the OPS which monitors that NE 10 (or NE 20, etc.). Further, the database read-out request unit 54 also has a function for performing a request to the other OPS 60 (or the OPS 70) unit for a database read out.

The database read out unit 55 receives the database read-out request from the other OPS 60 (or OPS 70), and reads out recorded data from the database 57 which is pertinent to the controls of a control number (i.e., the registered data which has been updated and changed) in the case where the control number has been appended to the read out request. In the case where a control number has not been appended to the read out request the database read out unit 55 reads out all of the content from the database 57 (i.e., all registered data which has been updated and changed, for example).

Further, in the case where there is a read-out request to read out the information regarding a registered NE, the database read out unit 55 reads out from the database 57 the registered information pertaining to the NE. The data base read out unit 55 also has a function for returning these various sets of data which have been read out as a reply to the communications control unit 53.

Figure 4:
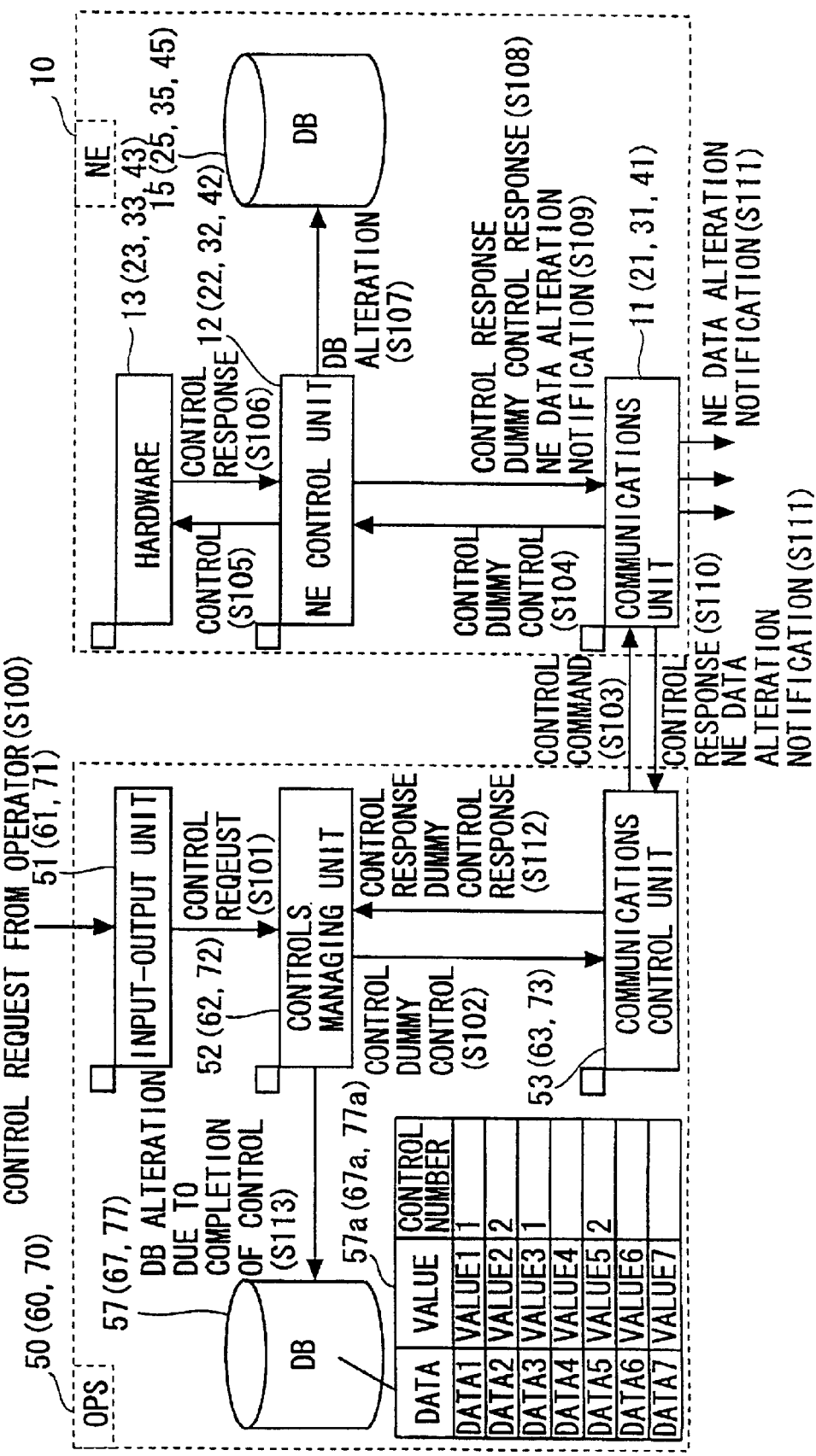
FIG. 4 is a diagram for explaining operations up to a point where a database 15 of an NE 10 is altered by means of controls from an OPS 15, and a database 57 of the OPS 50 is also altered.

Explanation will now be made of operations of a system of synchronizing databases of a plurality of OPS units having the construction described above with reference to FIG. 4 and FIG. 5. FIG. 4 is a diagram for explaining operations up to a point where the database 15 of the NE 10 and the database 57 of the OPS 50 are updated by means of controls from the OPS 50.

In the case where a control request to control the NE 10 has been received from an operator the OPS 50 transmits a control command with a network address of the OPS 50 to the NE 10. Specifically, the following processes S100 through S103 are performed.

When the input-output unit 51 receives the control request from the operator to control the NE 10 (S100), the input-output unit 51 sends this control request to the controls managing unit 52 (S101). When the controls managing unit 52 receives the control request from the input-output unit 51 it creates a control command having a control number and the network address of the OPS 50 attached thereto, and sends this to the communications control unit 53 (S102) The communications control unit 53 transmits this control command with the network address of the OPS 50 to the NE 10 (S103). Note that the control number corresponds to an altered data specification data for specifying which of the data registered in the database 57 has been updated and thus changed.

When the NE 10 receives the control command with the control number and the network address of the OPS 50 from the OPS 50, it performs controls on the hardware 13 based on this control command, and transmits the controlled results to the source of the control command, which is the OPS 50. Further, when the NE 10 receives the control command from the OPS 50, it transmits a NE data alteration notification with the network address of the OPS 50 and the control number which are received from the OPS 50 at least to the OPS 60 which is monitoring the NE 10 (i.e., which the NE 10 is linked to) other than the source of the control command OPS 50. Further, the NE 10 updates its own database 15 based on the controlled results performed on the hardware 13. Specifically, the following procedures S104 through S111 are performed.

The communications unit 11 of the NE 10 sends the control command received from the OPS 50 to the NE control unit 12 (S104). The NE control unit 12 performs controls of the hardware 13 based on the control command (S105). The hardware 13 returns the controlled results to the NE control unit 12 as a control response (S106). The NE control unit 12 updates the database 15 based on the controlled results (S107), and sends the controlled results to the communications unit 11 as a control response (S108). At the same time, the NE control unit 12 sends to the communications unit 11 the NE data alteration notification with the network address of the OPS 50 and the control number, which were attached to the control command received from the OPS 50 (S109).

It is possible for the communications unit 11 to transmit the controlled results as a control response to the source of the control command, which is the OPS 50 (S110), and also possible for it to transmit the NE data alteration notification described above at least to the OPS units which the NE 10 is linked to other than the source of the control command OPS 50 (note, "at least" means that it is also possible to include the source of the control command OPS 50 here, which would mean both OPS 50 and OPS 60 in this embodiment) (S111).

When the source of the control command OPS 50 receives the controlled results as a control response from the NE 10, it uses the controlled results to update the registered data (i.e., which is chiefly the physical data managed inside the NE, such as settings for the operations of the NE) which are registered in the database 57 in the OPS 50. Specifically, the following procedures S112 through S113 are performed.

The communications control unit 53 sends the control response received from the NE 10 to the controls managing unit 52 (S112). The controls managing unit 52 receives the control response and thus recognizes the completion of the control, so it updates the data registered in the database 57 (i.e., chiefly the physical data managed inside the NE, such as settings for the operations of the NE) based on the controlled results (S113). At this time, the controls managing unit 52 establishes a correspondence between a control number and that control number's registered data which has been updated and changed, and records these in the table 57a of the database 57. Accordingly, when the control number is used as a key for accessing the database 57, it becomes possible to discriminate the content of the alteration (i.e., the registered data) that was created using that control number.

Further, in the database 57 the alteration content (i.e., the registered data) is managed by means of the table 57a which establishes correspondences between the control numbers and the updated and altered registered data; however, as shown in FIG. 8, it is also possible for the database 57 to have a table 57b which establishes a correspondence between the control number and pointer information, which designates the location where the altered data is stored. In both the table 57a and the table 57b, it is indicated that a data 1 and a data 3 were altered by operations associated with a control number 1, and a data 2 and a data 5 were altered by operations associated with a control number 2. Data 4, data 6 and data 7 which do not have control numbers are either data which were not altered by controls of the OPS 50, or data which were altered by a synchronization request for the database.

Figure 5:
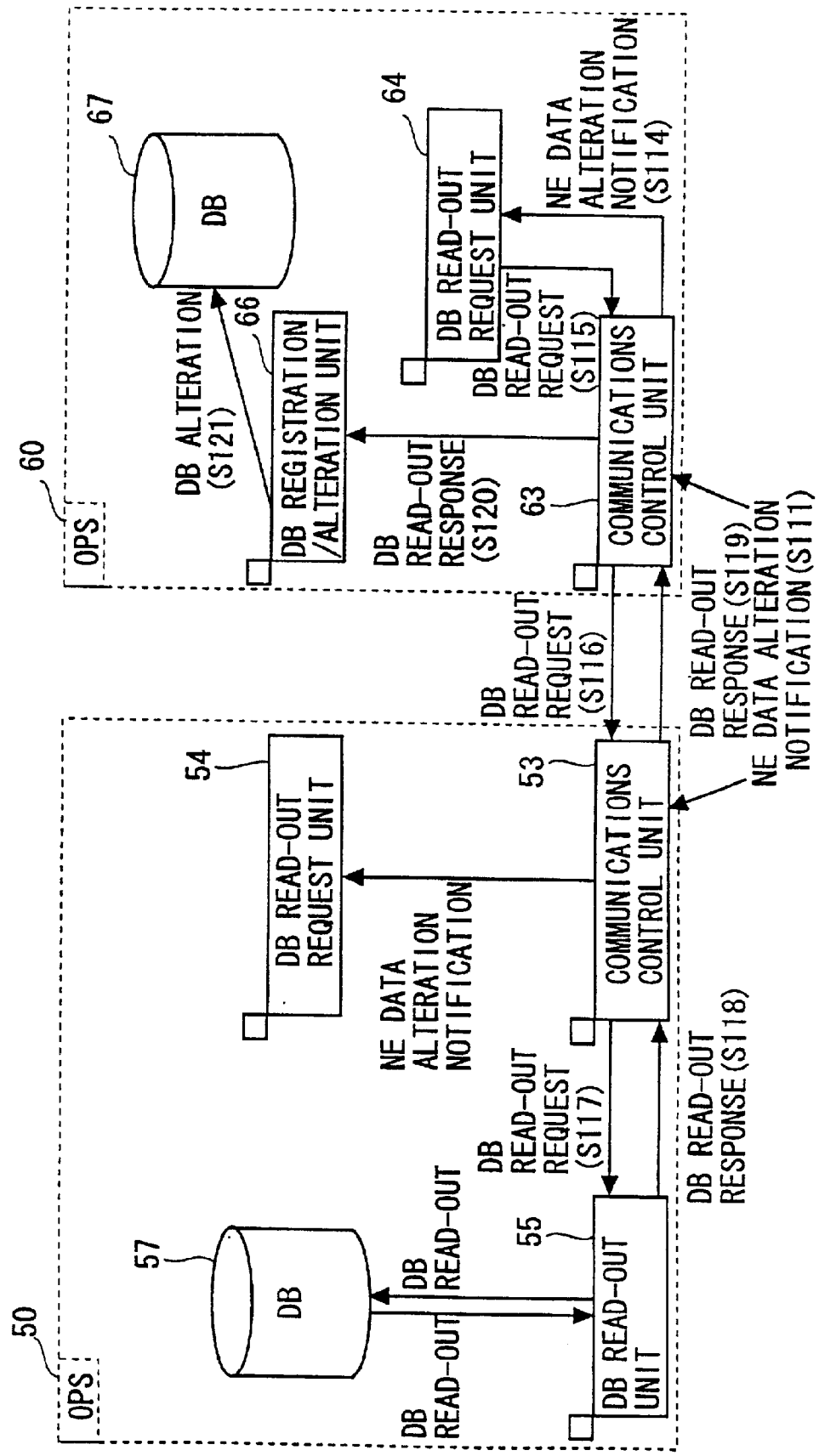
FIG. 5 is a diagram for explaining operations up to a point where an OPS 60 has received an NE data alteration notification and performs synchronization with the database 57 of the OPS 50.

FIG. 5 is a diagram for explaining operations up to a point where the OPS 60 which has received the NE data alteration notification performs synchronization with the database 57 of the OPS 50.

When the OPS 60 other than the OPS 50 which was the source of the control command receives the NE data alteration notification from the NE 10, it uses the address of the OPS 50 which is attached to the NE data alteration notification and transmits a read-out request to the OPS 50 which is the source of the control command requesting the OPS 50 to read out the updated, altered registered data (i.e., chiefly the physical data managed inside the NE, such as settings for the operations of the NE) which is recorded in the database 57 in that OPS 50, and in the case where the OPS 60 receives the registered data from the source of the control command OPS 50, the OPS 60 updates registered data (i.e., chiefly the physical data managed inside the NE, such as settings for the operations of the NE) which is recorded inside its database 67 based on this registered data received from the OPS 50. Specifically, the following procedures S114 through S121 are performed.

A communications control unit 63 of the OPS 60 sends to a data base read-out request unit 64 the NE data alteration notification received from the NE 10 (S114). The database read-out request unit 64 creates a database read-out request which is attached with the control number which was attached to the NE data alteration notification, and sends this request to the communications control unit 63 (S115). The communications control unit 63 transmits the database read-out request to the OPS 50 that is the source of the control command (S116). For this transmitting the address for the OPS 50 is taken from the address attached to the NE data alteration notification. Therefore, there no longer exists a need for each of the centralized monitoring devices to hold and manage the addresses of the other centralized monitoring devices for purposes of obtaining altered data (i.e., for purposes of synchronization).

When the communications control unit 53 of the OPS 50 receives the database read-out request from the OPS 60, it sends a database read-out request to the database read out unit 55 (S117). The data base read out unit 55 reads out from the data base 57 the registered data which is corresponded to a control number which is assigned to the database read-out request and serves as altered data specification data, and then transmits a response back to the communications control unit 53 as a database read-out reply (S118) The communications control unit 53 transmits the registered data back to the OPS 60 as the database read-out reply (S119).

The communications control unit 63 of the OPS 60 forwards the database read-out reply which it has received (i.e., registered data) over to a database registration/alteration unit 66 (S120) The database registration/alteration unit 66 uses the database read-out reply, which is registered data, to update the registered data recorded in a database 67 ((i.e., chiefly the physical data managed inside the NE, such as settings for the operations of the NE) (S121). Because the database 67 is updated based on the registered data which has been read out from the database 57, it becomes possible to synchronize (or match) the databases of a plurality of OPS units (i.e., OPS 50 and OPS 60 in this embodiment).

Note that the NE 10 transmits the NE data alteration notification to all of the OPS units which are monitoring that NE 10. Therefore, the NE data alteration notification is transmitted even to the source of the control command OPS 50; however, in the case where the OPS address attached to the NE data alteration notification (i.e., the OPS address of the control command source) matches with the control command source OPS 50's own address, the OPS 50 destroys the NE data alteration notification. This is because the data base 57 of the control command source OPS 50 is modified by means of the control response sent from the NE. The destruction mentioned here is performed by the database read-out request unit 54.

Figure 6:
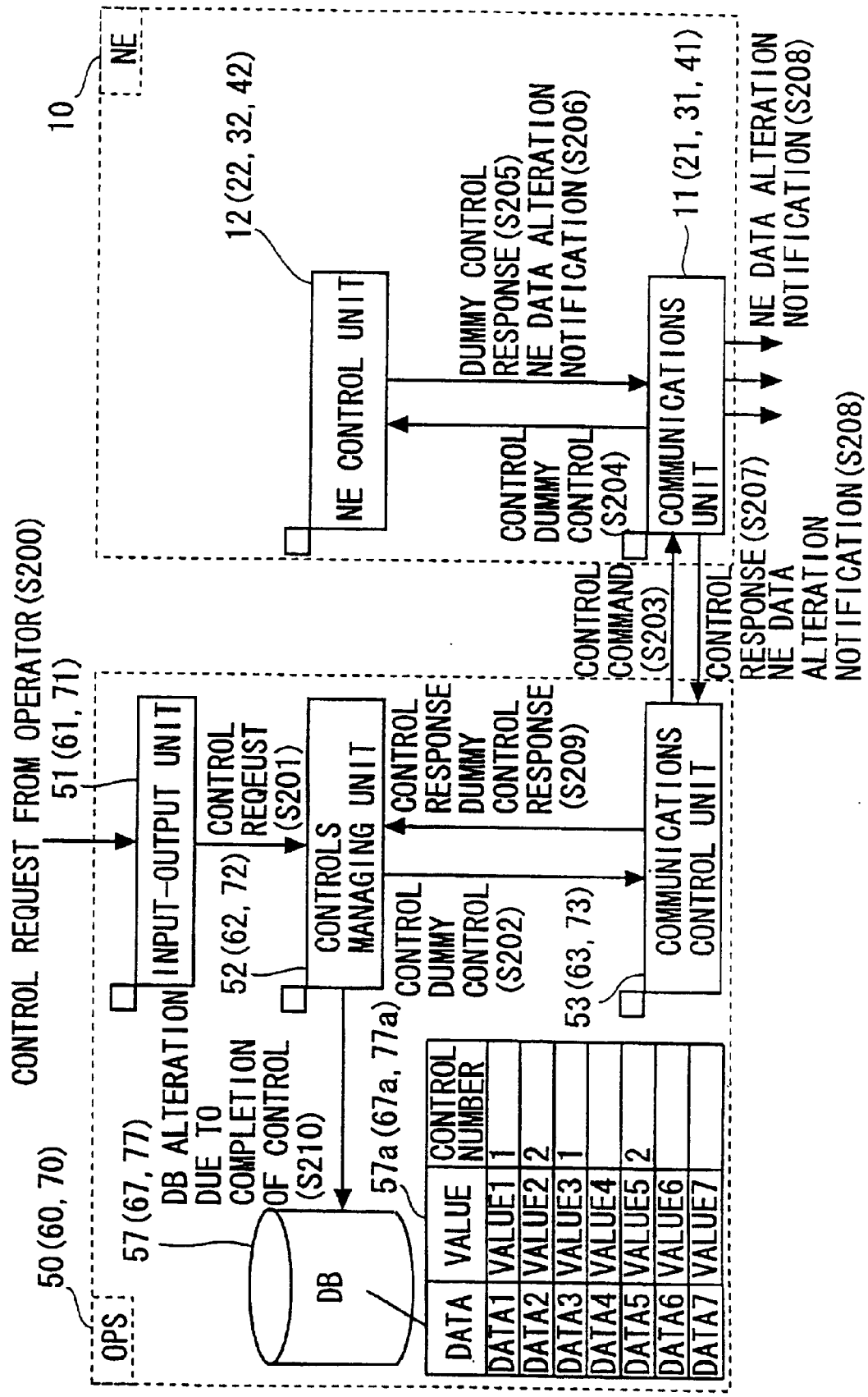
FIG. 6 is a diagram for explaining operations in a case where the OPS 50 sends a dummy control command to the NE.

Next, explanation will be made of operations in the case where the OPS 50 transmits a dummy control command to the NE with reference to FIG. 6. FIG. 6 is a diagram for explaining the operations in the case where the OPS 50 sends the dummy control command to the NE.

In the case where the OPS 50 receives an alteration request from the operator to alter the database 57 accommodated inside that OPS 50 but which does not include controls to be performed on the NE (e.g., a request to alter the logical data inside the OPS), the OPS 50 transmits a dummy control command with a control number and a network address of OPS 50 to the NE 10. Specifically, the following procedures S200 through S203 are performed.

When the input-output unit 51 receives an alteration request from the operator to alter the database 57 accommodated inside that OPS 50 but which does not include controls to be performed on the NE (e.g., a request to alter the logical data inside the OPS) (S200), the input-output unit 51 sends this control request to the controls managing unit 52 (S201). When the controls managing unit 52 receives the alteration request from the input-output unit 51, it creates a dummy control command which only has a control number and the network address of that OPS 50, and then sends this dummy control command to the communications control unit 53. The communications control unit 53 transmits the dummy control command with the network address of the OPS 50 to the NE 10 (S203).

When the NE 10 receives the dummy control command with the network address of the OPS 50 from the OPS 50, it transmits a dummy control response to the control command source OPS 50 without performing controls on the hardware 13. Further, when the NE 10 receives the dummy control command with the network address of the OPS 50 from the OPS 50, the NE 10 provides a notification of the network address of the OPS 50 by sending out a notification of the NE data alteration notification which has the network address of the OPS 50 and the control number attached thereto at least to the OPS units 60 other than the control command source OPS 50 which are monitoring that NE 10 (i.e., which the NE 10 is linked to). Note that the NE 10 does not update its database 15 in the case of the dummy control command. Specifically, the following procedures S204 through S208 are performed.

The communications unit 11 of the NE 10 sends the dummy control command with the network address of the OPS 50 it received from the OPS 50 to the NE control unit 12 (S204). The NE control unit 12 sends a dummy control response to the communications unit 11 (S205). At the same time, the NE control unit 12 sends to the communications unit 11 an NE data alteration notification attached with the OPS 50 network address and the control number which were attached assigned to the dummy control command received from the OPS 50 (S206).

The communications unit 11 transmits a control response to the dummy control command source OPS 50 (S207), and further, transmits the NE data alteration notification described above at least to the OPS units which the NE 10 is linked to other than the source of the dummy control command OPS 50 (note, "at least" means that it is also possible to include the source of the dummy control command OPS 50 here, which would mean both OPS 50 and OPS 60 in this embodiment) (S208).

In the case where the control command source OPS 50 receives the control response from the NE 10, it uses this control response to update the registered data that is recorded in its database 57 (i.e., logical data inside the OPS unit such as path management data, and comments). Specifically, the following procedures S209 through S210 are performed.

The communications control unit 53 sends the control response received from the NE 10 to the controls managing unit 52 (S209). The controls managing unit 52 receives the control response and thus recognizes the completion of the control, so it updates the data registered in the database 57 (i.e., logical data inside the OPS unit such as path management data, and comments) based on the response (S210). At this time, the controls managing unit 52 establishes a correspondence between a control number and that control number's registered data which has been updated and changed, and records these in the table 57a of the database 57. Accordingly, when the control number is used as a key for accessing the database 57, it becomes possible to discriminate the content of the alteration (i.e., the registered data) that was created using that control number.

When the OPS 60 other than the OPS 50 which was the source of the dummy control command receives the NE data alteration notification from the NE 10, it uses the address of the OPS 50 which is attached to the NE data alteration notification and transmits a read-out request to the OPS 50 which was the source of the dummy control command, requesting the OPS 50 to read out the updated, altered registered data (,i.e., logical data managed inside the OPS unit such as path management data, and comments) which is recorded in the database 57 in that OPS 50, and in the case where the OPS 60 receives the registered data from the source of the control command OPS 50, the OPS 60 updates the registered data (i.e., logical data managed inside the OPS unit such as path management data, or comments) which is recorded inside its database 67 based on this registered data. Specifically, the procedures S114 through S121 are performed as explained using FIG. 5 described above.

In this way the database 67 is updated based on the registered data which has been read out from the database 57; therefore, the synchronization (or matching) of the databases of the plurality of OPS units (i.e., OPS 50 and OPS 60 in this embodiment) can be achieved.

Figure 7:
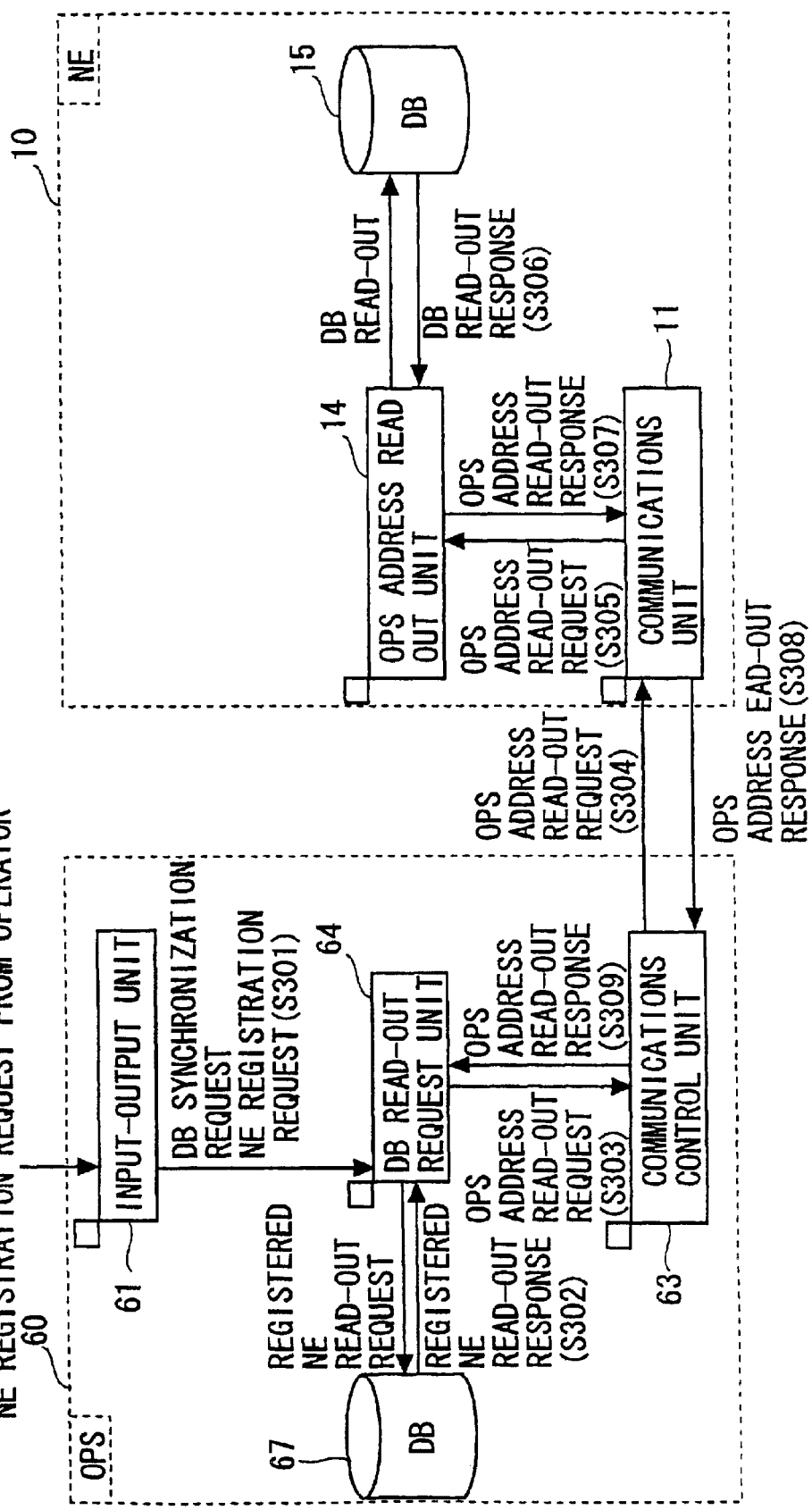
FIG. 7 is a diagram for explaining operations of the OPS 60 reading out altered data from the database of the OPS 50 all at once.

Next, explanation will be made with reference to FIG. 7, of operations of the OPS 60 reading the registered data out all at once from the data base of the OPS 50. FIG. 7 is a diagram for explaining the operations of the OPS 60 reading out from the OPS 50 database the updated and altered registered data all at once.

When the OPS 60 receives a database synchronization request from the operator, it transmits out to the NE 10 a read-out request for the NE 10 to read out the network addresses of the OPS 50 units which are monitoring the NE 10 units (i.e., which are linked to the NE units 10) other than the NE 10 unit of that OPS 60 (i.e., an OPS address read-out request); and then when the OPS 60 has received a notification of the OPS 50 address from the NE 10, the OPS 60 uses this OPS 50 address to transmit a read-out request to the OPS 50 for it to read out all of the registered data which has been altered due to the updating of the registered data (physical data and logical data) which is recorded in the database 57 in that OPS 50; and when all of registered data which has been updated and altered is received form the OPS 50, the OPS 60 uses this registered data to update the registered data (physical data and logical data) recorded in its own database 67. Specifically, the following procedures are performed.

When an input-output unit 61 receives the database synchronization request from the operator (S300), the input output unit 61 sends this database synchronization request to a database read-out request unit 64 (S301) The database read-out request unit 64 reads out from the database 67 the NE 10 address which is registered in the OPS 60 (S302), and makes a request (i.e., an OPS address read-out request) to the communications control unit 63 for it to read out the address of the OPS 50 which is linked to that NE 10 (S303). The communications control unit 63 transmits an OPS 50 address read-out request command to the NE 10 (S304).

When the communications unit 11 of the NE 10 receives the OPS 50 address read-out command from the OPS 60, a read-out request is made to the OPS address read-out unit 14 (S305). The OPS address read-out unit 14 reads out from the database 15 the address of the OPS 50 which is linked to that NE 10 (S306). The OPS 50 address which has been read out is then sent from the OPS address read-out unit 14 to the communications unit 11 as a reply (S308). The communications unit 11 replies with the OPS 50 address as a read-out reply to the OPS 60 which performed the OPS address read-out request (S308).

When the communications control unit 63 of the OPS 60 receives the read-out response with the OPS 50 address therein, the OPS 60 responds with this information as a reply to the database read-out request unit 64 (S309). The data base read-out request unit 64 obtains the OPS 50 address from this reply.

When the OPS 60 receives the OPS 50 address from the NE 10, the OPS 60 uses this OPS 50 address to send a read-out request (i.e., a database read-out request) to the OPS 50 for it to read out all of the registered data which has been altered by the updating of the registered data recorded in the database 57 in that OPS 50; and then when the OPS 60 has received all of this altered registered data from the OPS 50, it uses this registered data to update the registered data in its own database 67. Specifically, the procedures S115 through S121 are performed as explained using FIG. 5 described above. Note that a database read-out request that is not attached with a control number is sent as the database read-out request.

In this way the registered data recorded in the database 67 is updated based on the registered data which has been altered due to the updating of the registered data recorded in the database 57; therefore, the synchronization (matching) of the databases of the plurality of OPS units (i.e., OPS 50 and OPS 60 in this embodiment) can be achieved. In other words, even in the case where the communication between the OPS and the NE has been severed, or where the OPS has been rebooted, it is still possible to achieve synchronization with the most current of the database being managed by the other OPS units when necessary and with the least possible amount of work.

Next, explanation will be made regarding procedures of an NE registration request, and particularly of operations for making an OPS address inquiry to the NE. FIG. 7 is a diagram for explaining the procedures of the NE registration request, and particularly of the operations for making the OPS address inquiry to the NE.

Just as in the case where the OPS 60 receives the database synchronization request described above, when the OPS 60 receives the NE registration request from the operator, it transmits a read-out request (i.e., an OPS address read-out request) to the NE 10 requesting the NE 10 to read out the network addresses of the OPS 50 units which are monitoring the NE 10 units (i.e., are linked to NE 10 units) other than the NE 10 of that OPS 60, and then the OPS 60 acquires the OPS 50 address from the NE 10.

When the OPS 60 receives the notification of the OPS 50 address from the NE 10, the OPS 60 uses this OPS 50 address to transmit a read-out request to the OPS 50 requesting it to read out data which is pertinent to the NE and stored in the database 57 of the OPS 50 (such as the NE internal physical data in NE 20, for example); and then when the OPS 60 receives from the OPS 50 the data that is pertinent to the NE, the OPS 60 uses this data to register data pertinent to the NE in its own database 67.

Therefore, in the case where a new OPS is added to the network, it is possible to register an NE in the new OPS with the minimal amount of work.

Further database synchronization after this point can be performed by the operator performing another database synchronization request; however, it is also possible to have the completion of the updating of the database 67 by the database registering/updating unit 66 of the OPS 60 serve as a trigger for the database synchronization request to be sent to the database read-out request unit 64, whereby the procedures from the NE registration through the database synchronization are to be performed all together with the registration of the NE.

The above embodiment depicts the three types of reading out of data: the reading out from the database read-out request unit 64 of the altered data which is related to the control number; the reading out of all the data; and the reading out of the registered NE (i.e., data pertinent to the NE). However, it is possible to change the command by adding data for distinguishing among these three types of read-outs to the database read-out command. FIG. 9 depicts one example of such data.

In the embodiment described above, the same network as that connected with the NE is used for the synchronization of the data bases; however, in the case where a different network is used as an OPS network for communication between or among the OPS units, it becomes possible to achieve the synchronization using as the OPS network address the address that is assigned in the control request made to the NE. Further, by making a plurality of OPS addresses be managed on the NE side, the NE units become capable of managing the OPS network addresses as well, which means that even in the case where the OPS address read-out requests are made to the NE units, it is possible to reply to these requests with the address of the network described above which is being used by the OPS units only.

Figure 10:
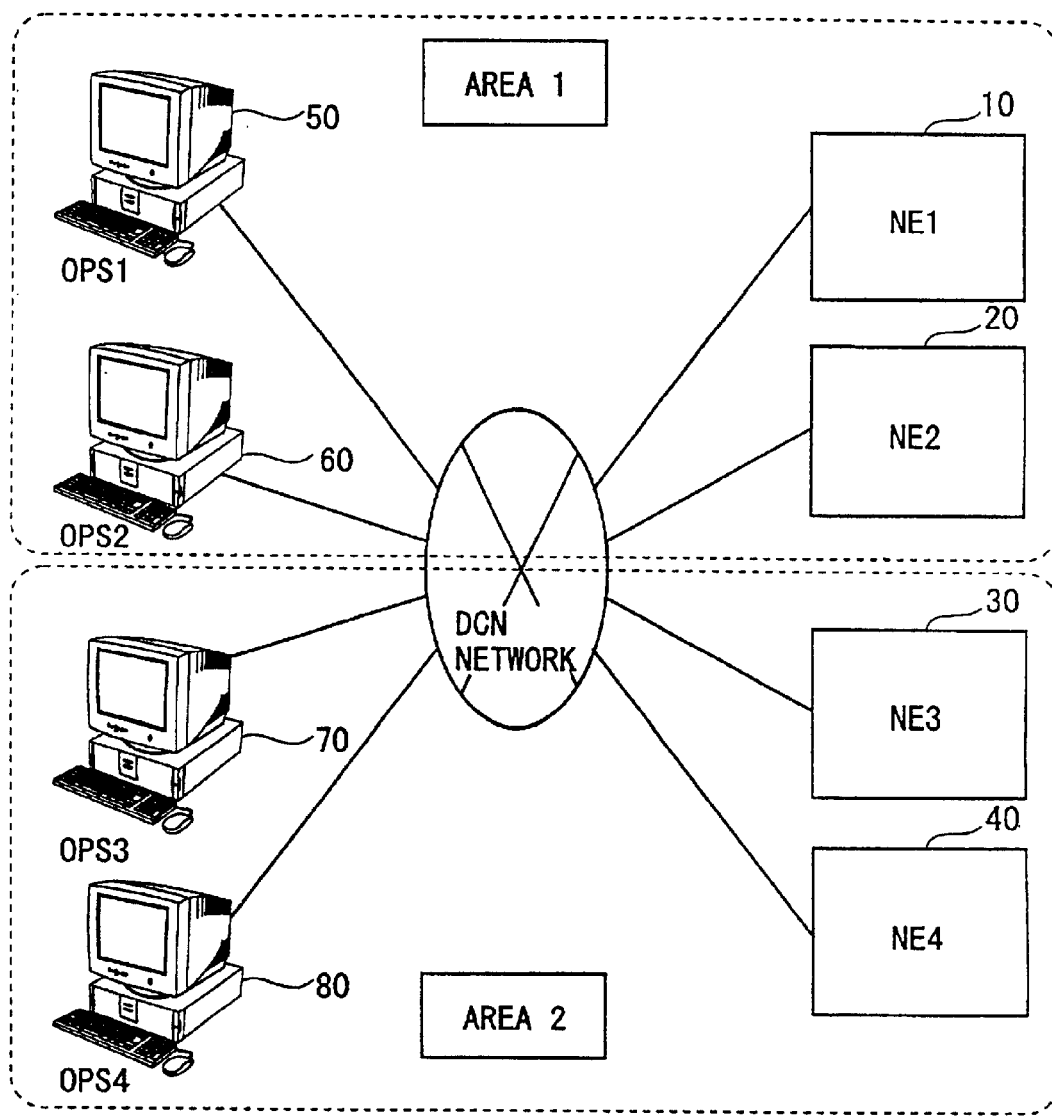
FIG. 10 is a diagram for explaining one example in which the synchronization system for databases of a plurality of OPS units according to the present invention is applied to a network which is divided into two areas.

Consider a case in which an entire network is divided into areas, as described in FIG. 10, and the OPS for a given area monitors the NE units in each area. Even in the case of such a network, when the database 57 of the OPS 50 is altered, the NE data alteration notification is only delivered to the OPS 60 of that area, as explained in connection with FIG. 4, it is still possible to achieve database synchronization of OPS units which are within the same given area.

Even if, for example, two such networks are prepared and these two networks are both connected to the same network, there will be no interference by one of these two networks into the database synchronization procedures of the other. Therefore, it is possible to perform data base synchronization even in a network which is divided into areas and in which each area is being monitored by a different OPS.

Accordingly, the NE sends out the NE data alteration notification indicating the data change for purposes of performing the database synchronization between or among the OPS units only to the OPS which is monitoring it; therefore, as shown in FIG. 9, even if the "area OPS" monitoring method is being used, the notification for database synchronization will not be sent to the OPS units which are not monitoring that NE, so the database synchronization will only be performed on the OPS units which are monitoring the area to which that NE belongs.

Note that the present invention can be reduced to practice in a variety of other ways without departing from its spirit or essential characteristics. Therefore, every aspect of the embodiments described above is nothing more than a mere example and should not be interpreted in a limited fashion.

As explained above, according to the present invention, in a communications system which includes a communications device and a plurality of centralized monitoring devices which monitor this communications device, and in which each of these centralized monitoring devices accommodates its own database, it becomes possible to achieve synchronization (or matching) of the databases of the OPS units (i.e., such as the physical data inside the NE and the logical data inside the OPS) without each OPS having to possess and manage the network addresses of the other OPS units included in the communications system (i.e., network).

Further, according to the present invention, in the case where the database (i.e., chiefly the logical data inside the OPS) is altered by means of closed manipulations inside the OPS (i.e., manipulations which do not include controls performed on the NE) it is possible to achieve synchronization (or matching) of the databases of the OPS units (i.e., chiefly the logical data inside the OPS) without relying on procedures such as manual inputting.

Further, according to the present invention, in such cases where the communications between the OPS and the NE is severed, or where the OPS has been rebooted, it is possible to achieve synchronization (or matching) with the most current of the databases being managed by the other OPS units as necessary and with the least possible amount of work.

Further, according to the present invention, in the case where a new OPS is added to the network, it is possible to register one NE into the database of this new OPS, and thereby, synchronizing the registration information of the NE from the OPS units which are linked to that registered NE. Therefore, in the case where a new OPS is added to the network, it is possible to decrease the amount of time for building the database of the new OPS. That is, the registration of the NE in the new OPS becomes possible with the minimal amount of work.

What is claimed is:

1. A system of synchronizing databases of a plurality of monitoring devices in a communications system having a communications device, a first monitoring device and a second monitoring device for monitoring the communications device and a network connecting these devices, and in which the communications device retains a network address of the second monitoring device and each of the monitoring devices accommodates a database, comprising:

an address read-out request transmitting unit transmitting from the first monitoring device to the communications device a request for reading the network address of the second monitoring device;

an altered data read-out request transmitting unit transmitting from the first monitoring device to the second monitoring device a request for reading registered data which is altered by a updating operation and recorded in the database accommodated by the second monitoring device by using the network address of second monitoring device received from the communications device, when the first monitoring device receives the network address of the second monitoring device from the communications device;

a database updating unit updating registered data recorded in the database accommodated by the first monitoring device based on the registered data received from the second monitoring device, when the first monitoring device receives the registered data which is altered by the updating operation and recorded in the database accommodated by the second monitoring device from the second monitoring device.

2. A system of synchronizing databases of a plurality of monitoring devices in a communications system having a first communications device and a second communications device, a first monitoring device for monitoring these communications devices and a network connecting these devices, and in which the first communications device retains a network address of the first monitoring device, and the first monitoring device accommodates a database storing data relevant to the second communications device, comprising:

an address read-out request transmitting unit transmitting from a second monitoring device to the first communication device a request for reading the network address of the first monitoring device, when the second monitoring device is newly connected to the network;

a read-out request transmitting unit transmitting from a second monitoring device to the first monitoring device a request for reading data relevant to the second communications device which is recorded in the database accommodated by the first monitoring device, by using the network address of the first monitoring device received from the first communication device, when the second monitoring device receives the network address of the first monitoring device from the first communications device;

recording unit recording the data relevant to the second communications device received from the first monitoring device in a database accommodated by the second monitoring device, when the second monitoring device receives the data relevant to the second communications device from the first monitoring device.

3. A system of synchronizing databases of a plurality of monitoring devices in a communications system having a communications device, a first monitoring device and a second monitoring device for monitoring the communications device and a network connecting these devices, in which each of the monitoring devices accommodates a database, comprising:

a control command transmitting unit transmitting a control command with a network address of the first monitoring device from the first monitoring device to the communications device;

an address transmitting unit transmitting the network address of the first monitoring device received from the first monitoring device from the communications device to the second monitoring device;

a first database updating unit updating registered data recorded in the database accommodated by the first monitoring device;

a request transmitting unit transmitting a read-out request for reading out registered data which is altered by the updating operation and recorded in the database accommodated by the first monitoring from the second monitoring device to the first monitoring device, by using the network address of the first monitoring device received from the communications device;

a second database updating unit updating registered data recorded in the database accommodated by the second monitoring device based on the registered data received from the first monitoring device, when the second monitoring device receives the registered data altered by the updating operation from the first monitoring device; and a control request receiving unit receiving a request for controlling the communications device from an operator.

wherein the control command transmitting unit transmits the control command with a network address of the first monitoring device from the first monitoring device to the communications device, when the first monitoring device receives the control request from the operator.

4. A system of synchronizing databases of a plurality of monitoring devices according to claim 3, further comprising:

a controlled result transmitting unit transmitting a result controlled by the communications device based on the control command received from the first monitoring device from the communication device to the first monitoring device; and wherein the first database updating unit updates registered data recorded in the database accommodated by the first monitoring devices when the first monitoring device receives the controlled result from the communications device.

5. A system of synchronizing databases of a plurality of monitoring devices according to claim 3, further comprising:

an alteration request receiving unit receiving a request for altering the database accommodated by the first monitoring device which does not control the communications device from the operator;

wherein the control command transmitting unit transmits a dummy control command with a network address of the first monitoring device from the first monitoring device to the communications device, when the first monitoring device receives the alteration request which does not control the communications device from the operator.

6. A system of synchronizing databases of a plurality of monitoring devices according to claim 3, wherein the control command transmitting unit transmits from the first monitoring device to the communications device the control command with the network address of the first monitoring device and a altered data specification data to specify registered data which is altered by the updating operation and recorded in the database accommodated by the first monitoring device;

wherein the address transmitting unit transmits from the communications device to the second monitoring device the network address of the first monitoring device and the altered data specification data which are received from the first monitoring device;

wherein the request transmitting unit transmits from the second monitoring device to the first monitoring device the read-out request with the altered data specification data received from the communications device, when the second monitoring device receives registered data specified by the altered data specification data from the first monitoring device, the second monitoring device updates the registered data recorded in the database accommodated by the second monitoring device based on the registered data which is specified by the altered data specification data and received from the first monitoring device.

7. A method of synchronizing databases of a plurality of monitoring devices in a communications system having a first communications device and a second communications device, a first monitoring device for monitoring these communications devices and a network connecting these devices, and in which the first communications device retains a network address of the first monitoring device, and the first monitoring device accommodates a database storing data relevant to the second communications device, comprising a step of:

transmitting, by a second monitoring device, a request for reading the network address of the first monitoring device to the first communication device, when the second monitoring device is newly connected to the network;

transmitting, by a second monitoring device, to the first monitoring device a request for reading data relevant to the second communications device which is recorded in the database accommodated by the first monitoring device, by using the network address of the first monitoring device received from the first communication device, when the second monitoring device receives the network address of the first monitoring device from the first communications device;

recording, by the second monitoring device, the data relevant to the second communications device received from the first monitoring device in a database accommodated by the second monitoring device, when the second monitoring device receives the data relevant to the second communications device from the first monitoring device.

8. A method of synchronizing databases of a plurality of monitoring devices in a communications system having a communications device, a first monitoring device and a second monitoring device for monitoring the communications device and a network connecting these devices, and in which the communications device retains a network address of the second monitoring device and each of the monitoring devices accommodates a database, comprising a step of:

transmitting, by the first monitoring device, a request for reading the network address of the second monitoring device to the communications device;

transmitting by the first monitoring device, a request for reading registered data which is altered by an updating operation and recorded in the database accommodated by the second monitoring device, said transmitting is to the second monitoring device by using the network address of the second monitoring device received from the communications device, when the first monitoring device receives the network address of the second monitoring device from the communications device;

updating, by the first monitoring device, registered data recorded in the database accommodated by the first monitoring device based on the registered data received from the second monitoring device, when the first monitoring device receives the registered data which is altered by the updating operation and recorded in the database accommodated by the second monitoring device from the second monitoring device.

9. A method of synchronizing databases of a plurality of monitoring devices in a communications system having a communications device, a first monitoring device and a second monitoring device for monitoring the communications device and a network connecting these devices, in which each of the monitoring devices accommodates a database, comprising:

a first step of transmitting, by the first monitoring device, a control command with a network address of the first monitoring device to the communications device;

a second step of transmitting, by the communications device, the network address of the first monitoring device received from the first monitoring device to the second monitoring device;

a third step of updating, by the first monitoring device, registered data recorded in the database accommodated by the first monitoring device;

a fourth step of transmitting, by the second monitoring device, a read-out request for reading out registered data which is altered by the updating operation and recorded in the database accommodated by the first monitoring device to the first monitoring device by using the network address of the first monitoring device received from the communications device, and wherein when the second monitoring device receives the registered data altered by the updating operation from the first monitoring device, the second monitoring device updates registered data recorded in the database accommodated by the second monitoring device based on the registered data received from the first monitoring device; and a fifth step of receiving, by the first monitoring device, a control request for controlling the communications device from an operator; wherein the first step, when the first monitoring device receives the control request from the operator, the first monitoring device transmits the control command with a network address of the first monitoring device to the communications device.

10. A method of synchronizing databases of a plurality of monitoring devices according to claim 9, further comprising:

sixth step of performing control by the communications device, based on the control command received from the first monitoring device, and transmitting, by the communications device, the controlled result to the first monitoring device, wherein the third step, when the first monitoring device receives the controlled result from the communications device, the first monitoring device updates registered data recorded in the database accommodated by the first monitoring device.

11. A method of synchronizing databases of a plurality of monitoring devices according to claim 9, wherein the registered data is physical data.

12. A method of synchronizing databases of a plurality of monitoring devices according to claim 11, wherein the physical data is data being managed inside the communications device, such as settings for operations of the communications device.

13. A method of synchronizing databases of a plurality of monitoring devices according to claim 9, further comprising:

a seventh step of receiving, by the first monitoring device, a request for altering the database accommodated by the first monitoring device which does not control the communication device from the operator, wherein the first step, when the first monitoring device receives the request which does not control the communication device from the operator, the first monitoring device transmits a dummy control command with a network address of the first monitoring device to the communications device.

14. A method of synchronizing databases of a plurality of monitoring devices according to claim 9, wherein the first step, the first monitoring device transmits to the communications device the control command with the network address of the first monitoring device and a altered data specification data to specify registered data which is altered by the updating operation and recorded in the database accommodated by the first monitoring device; wherein the second step, the communication device transmits to the second monitoring device the network address of the first monitoring device and the altered data specification data which are received from the first monitoring device; wherein the fourth step, the second monitoring device transmits to the first monitoring device the read-out request with the altered data specification data received from the communications device, when the second monitoring device receives registered data specified by the altered data specification data from the first monitoring device, the second monitoring device updates the registered data recorded in the database accommodated by the second monitoring device based on the registered data which is specified by the altered data specification data and received from the first monitoring devices.

15. A method of synchronizing databases of a plurality of monitoring devices according to claim 14, wherein the altered data specification data is a control number.

* * * * *